United States Patent [19]

Silver et al.

[11] 4,020,468
[45] Apr. 26, 1977

[54] COMPRESSED INFORMATION SYSTEM

[75] Inventors: Paul W. Silver, Bowie; Richard A. Fuselier, Millersville; William B. Moore, III, Baltimore, all of Md.

[73] Assignee: Westinghouse Electric Corporation, Pittsburgh, Pa.

[22] Filed: Dec. 10, 1974

[21] Appl. No.: 531,491

[52] U.S. Cl. .................... 340/172.5; 35/10
[51] Int. Cl.² .............. G06F 3/14; G06F 3/16; G09B 7/00
[58] Field of Search ........ 340/172.5; 353/25, 26 A, 353/26 R, 15, 19; 445/1; 35/10, 12 D

[56] References Cited

UNITED STATES PATENTS

| | | | |
|---|---|---|---|
| 3,324,458 | 6/1967 | MacArthur | 340/172.5 |
| 3,586,431 | 6/1971 | Fraser | 353/26 R |
| 3,704,451 | 11/1972 | Pearson | 340/172.5 |
| 3,708,677 | 1/1973 | Volk et al. | 353/26 A |
| 3,743,400 | 7/1973 | Haning et al. | 353/26 A |
| 3,790,265 | 2/1974 | Ogiso | 353/19 |
| 3,823,490 | 7/1974 | Konik | 35/10 |
| 3,832,790 | 9/1974 | Fryer, Jr. et al. | 35/10 |
| 3,861,792 | 1/1975 | Donati | 353/15 |

Primary Examiner—Harvey E. Springborn
Attorney, Agent, or Firm—J. B. Hinson

[57] ABSTRACT

A multi-function information system utilizing a specialized modular information library is disclosed. In its preferred embodiment, the system is applied to the problem of teaching technicians the theory of specific apparatus and providing a tool to aid in the location and correction of malfunctions of the apparatus. In such an application, the system may comprise a video playback system and a video-cassette library containing a description of how the apparatus operates and malfunction correction procedures. Special procedures are employed in constructing the library to assure that the teaching and malfunction correction times are minimized.

1 Claim, 5 Drawing Figures

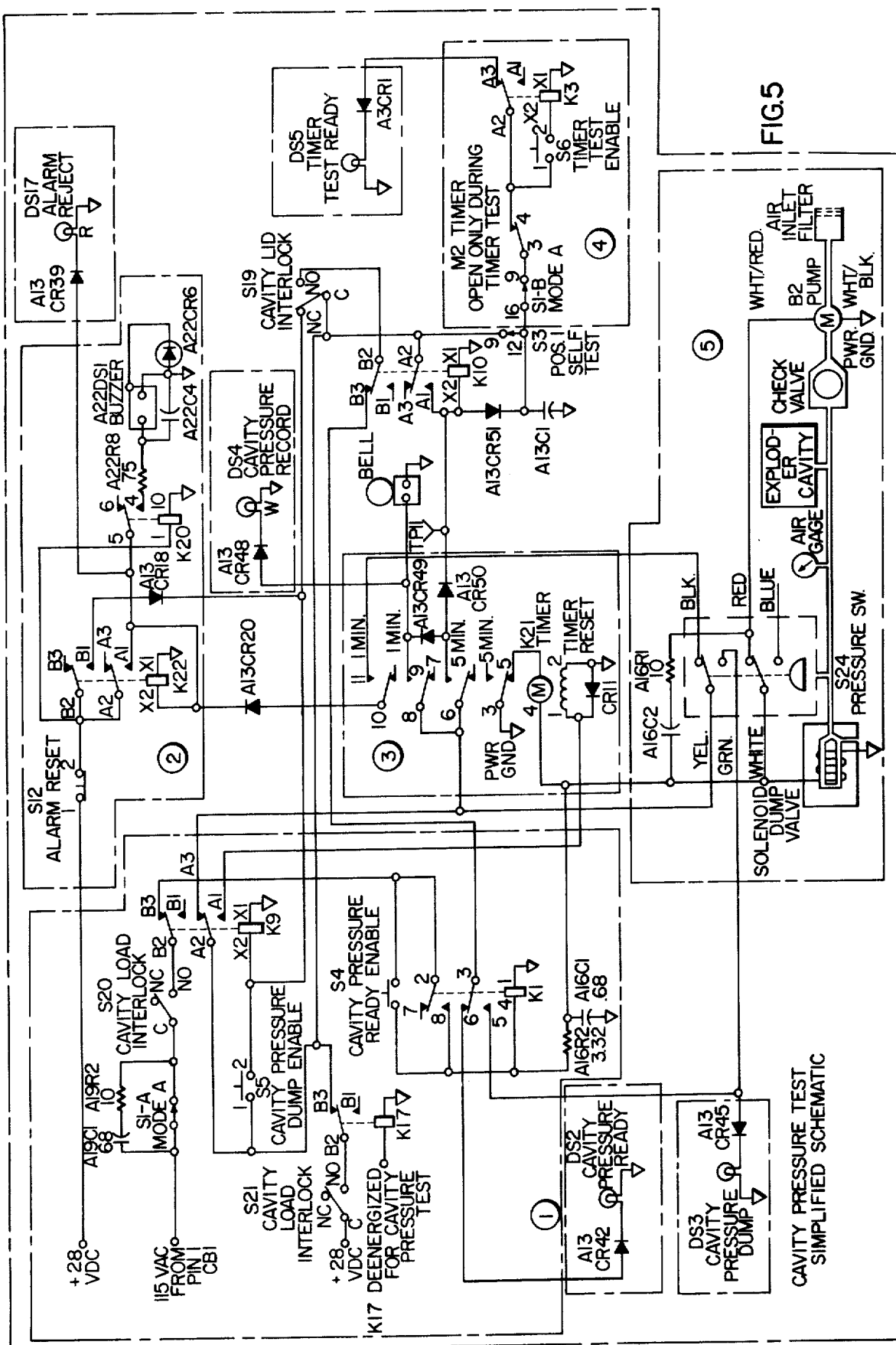

COMPRESSED INFORMATION SYSTEM

BACKGROUND OF THE INVENTION

Field of the Invention

The invention relates to information systems and more specifically to information systems for performing the combined function of teaching the theory of specific apparatus and providing maintenance aids therefor.

SUMMARY OF THE INVENTION

The compressed information system is a general purpose system applicable to a wide range of problems. The system consists of a special purpose stored library and the equipment necessary to use the library. In its most useful form, it is contemplated that the library will be video cassettes. The complete system will consist of the cassettes forming the stored library, the cassette playback system and associated user manuals.

The system actually built was designed to teach the theory of a test system for a torpedo exploder mechanism and to provide a systematic method for isolating and correcting malfunctions of the test system.

The contents and organization of the library are important to the proper functioning of the systems. All factors having a major influence on the effectiveness of the final system are systematically considered in defining and organizing the library. Factors which are common to all applications and must always be considered are:

1. The educational level and technical competence of the ultimate user.
2. The purpose of the system, i.e. is it to be a training system or the combination of a training and maintenance system.

Based on the educational level of the ultimate user and the purpose of the system, a four step process is used to develop the compressed information library.

The first phase of the process is to gather, review and analyze all available data which is related to the functions to be performed by the system. During the first phase of the process data is gathered, analyzed, and edited to eliminate all unnecessary data and to format the essential data into the most useful form. This results in a significant compression of the data and contributes significantly to the ultimate efficiency of the system.

After the information related to the problem has been gathered, analyzed and edited, as described above, a study is made to determine the most effective method of conveying the information to the ultimate user. This is the second step in the process. Factors to be considered which are independent of the application include:

a. the number of people who will simultaneously use the system,
  b. the environment in which the system must operate,
  c. the effects of a failure of the system,
  d. the type of data which must be conveyed, and
  e. the necessity of adding to or deleting information from the library.

In each situation there may be conflicts between the various factors effecting the choice of a method for conveying the information. For example, it may be found that the storage means having the lowest failure rate is the most difficult to utilize in situations where it may be desirable to change the library after t is originally produced. This demostrates the necessity for systematically considering these factors so that the most favorable compromises can be selected. At the completion of this step the information to be included in the library, the basic organization of the library, and the medium to store the information will have been selected.

Having selected a storage and reproduction medium, video-cassettes for example, and selected the essential information to be included in the library, production of the library can begin. This is the fourth step in the process. At this point, he unique characteristics of the storage medium and the information to be conveyed are considered to reduce the size of the library. The library is also modularized and indexed so that it can be conveniently used. This results in a second compression of this amount of information which it is necessary to convey. After the library has been produced and verified, the completed system is delivered to the user.

In the embodiment of the invention actually constructed and tested, the completed system included a video tape cassette library, a playback system and printed user aids.

In actual test a system consisting of a video-cassette library produced as described above and a cassette reproduction system has been found to reduce the training time for technician for an electronic system by a factor to ten. A reduction in the time required to isolate and repair faults was also achieved.

DESCRIPTION OF THE DRAWINGS

FIG. 5 is a simplified schematic diagram of some of the circuitry associated with the apparatus illustrated in FIG. 4;

FIG. 6 is a library for maintaining the apparatus illustrated in FIG. 4.

DETAILED DESCRIPTION

Figure 1:
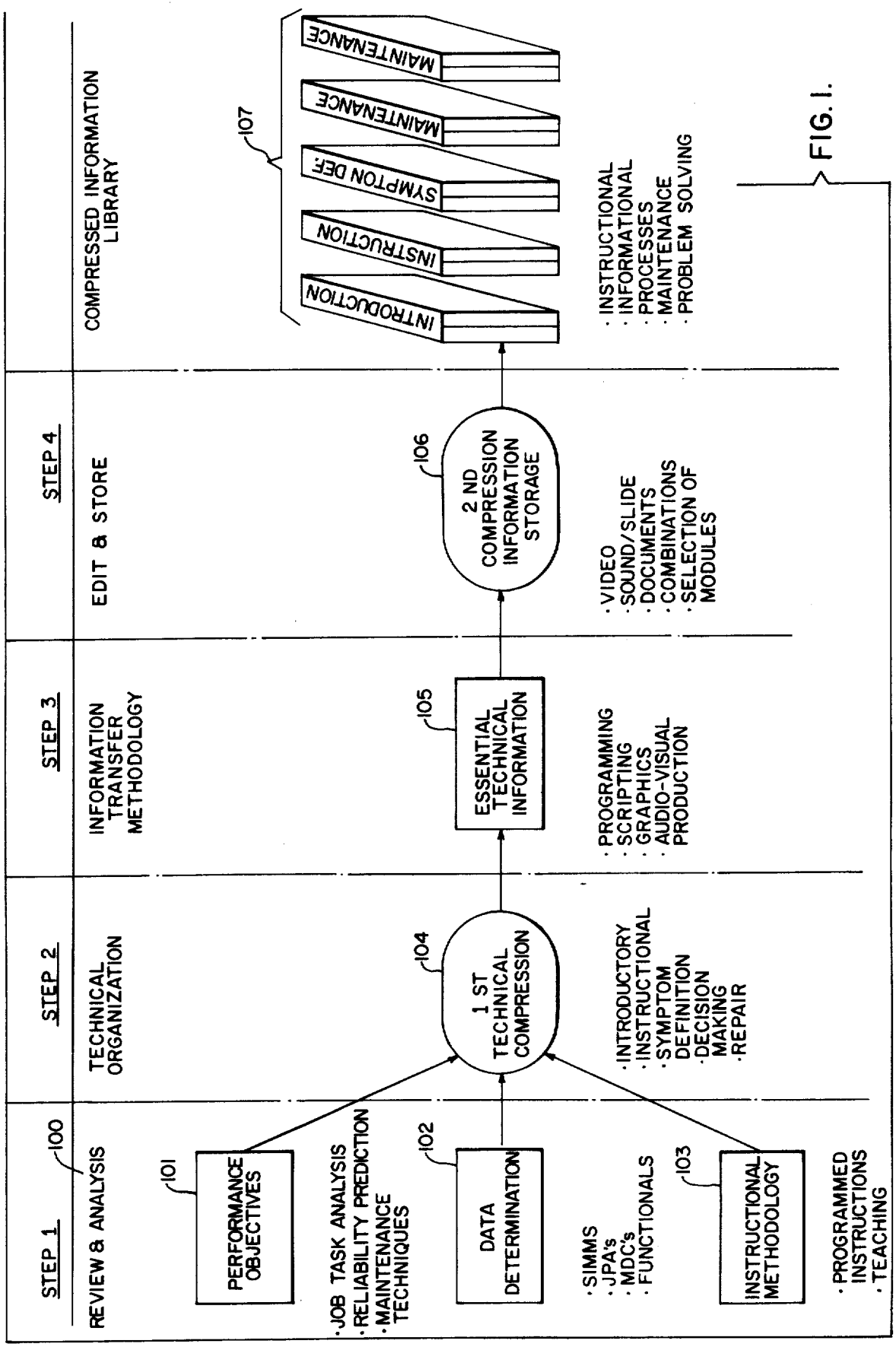
FIG. 1 is a diagram illustrating the process used in developing the library.

The process for developing the library which is a part of the compressed information system is illustrated in FIG. 1. Systematic development of the library requires that the major factors effecting the ultimate performance of the system and the interrelationships between these factors be considered. It has been found that the process illustrated in FIG. 1 accomplishes this result.

Development of the library for the compressed informaion is a four step process. For purposes of illustration, this process will be described with reference to a library consisting of video-cassettes. The purpose of the system utilizing the library is to teach a technician the theory of an electronic circuit and aid him in locating faults and repairing electronic circuit. It is obvious that the process and system can be easily applied to other problems.

The first step of the process is a review and analysis phase, illustrated at reference numeral 100. This step is necessary because most information in its initial form is disorganized and incoherent. A systematic method for reviewing, analyzing, and organizing information is necessary in order to produce a library which can be efficiently used. The review and analysis phase is subdivided into three substantially independent sub steps. Illustrative examples of each of these steps will be subsequently described in detail.

Fundamental to the proper functioning of any system is a thorough analysis and definition of the performance objectives of the system. The details of this task, illustrates functionally at reference numeral 101, will vary from system to system, however, the basic function is always the same. The performance objectives always define the functions to be performed by the user and the knowledge to be acquired by him by using the system.

The definition of performance objectives related to the acquisition of new knowledge may be conveniently accomplished by using standard job task analysis in which detailed evaluations of the functions to be performed are used to construct a series of learning steps designed to accomplish the desired performance by the user.

If the problem requires the presentation of technical information relating to equipment operation or maintenance, the performance objectives may be determined for example, by analyzing reliability prediction worksheets. Typical worksheets systematically determine failure rate probability for each component or lowest replaceable unit (LRU). This data is used as a reference to define the tasks to be performed by the frequency of each task. The instructional and informational material is then developed in accordance with the priorities resulting from the reliability prediction analyses and the job task analysis taking into consideration the maintenance techniques to be used.

In the illustrative embodiment, the performance objectives were based on the results of an analysis of the task to be performed, reliability predictions of the components of the circuit and the maintenance techniques to be used. These factors are tabulated in FIG. 1.

Another function incorporated into the review and analysis step 100 is a determination of what data related to the problem is available. Data determination consists of reviewing available literature, drawings, diagrams, and procedures related to the problem to be solved by the system and identifying material that will be compatible with the performance objectives. A selection of the best data for each objective of the system is then made. For the maintenance functions hybrid type of diagrams including SIMMS (Symbolic Integrated Maintenance Management System), JPA's (Job Performance Aids), MDC's (Maintenance Dependency Charts), and Functional Block Diagrams may be used to accomplish the training and maintenance goals. These are military type documents and may not always be available. Other types of maintenance documents may be used. If no documents of this type are available, it may be necessary to develop and document identifying the symptoms which various failures may produce. In all cases, the goal is to begin with an observed failure or fact and systematically identify faults which could lead to the failure or conditions which could lead to the observed fact. Additional transitional material required to assist in compressing the technical content may be included with this activity.

In the illustrative example, data for use in training consists primarily of factual information describing how the circuit (in our example) works. Portions of the available maintenance data may also be used. A selection is made such that the library will contain sufficient information to form a basis for teaching the theory of the circuit without being excessively redundant.

The data determination phase is functionally illustrated at reference numeral 102 of FIG. 1. In the example, the data determination phase consisted primarily of an analysis of Simms, JPA's, MDC's, and functional diagrams resulting in a selection of the most appropriate items for inclusion in the library.

The instructional strategy is important to effectively transmit the data to the student in the minimum time. The use of programmed instruction, modular blocks of instruction, self-paced learning situations and student interaction techniques convey the information accurately with as much feedback to the student as possible. The most effective method of presenting information will vary depending upon the task to be accomplished. Selection of a particular instructional technique, and associated training aids to accomplish each objective is the key element in the effective transmission of data. In the illustrative system described in this application conventional lecture teaching techniques will be utilized. This technique was selected because it was familiar to the expected user and permitted maximum use of diagrams charts, drawings and other available visual aids. The step of reviewing and selecting an instruction methodology is illustrated at reference numeral 103 of FIG. 1.

The grouping and organization of technical information to compress or reduce the volume of the information is the next step in producing the library. One method of compressing the information is to group all essential information into categories. Examples of categories which may be used are:

a. Introductory,
b. Instructional,
c. Symptom Definition,
d. Decision Making, and
e. Repair Instructions.

These categories are tabulated in FIG. 1.

In the process of organizing the information in this way all unnecessary data is eleminated without sacrificing the goals of the information system. The resulting information is the baseline data which is fed into the technical organization process. This technical organization process step is illustrated of reference numeral 104 or FIG. 1.

The essential technical information or baseline data is converted into a format which can be readily stored and transmitted to the user. Assuming that the library is to to be a series of video-cassettes. The major steps involved are:

a. Programming,
b. Scripting,
c. Graphics, and
d. Audio Visual Production

These steps are tabulated in FIG. 1.

All the data selected for use is transformed into camera ready copy with associated scripts, narratives and production planning to be utilized in the next step of the process. This process is illustrated functionally at reference numeral 105 of FIG. 1.

The process of staging and producing an informational program is another opportunity for data compression. For example, television or audio visual techniques offer a natural method for presenting high-impact condensed technical information. The carefully planned, predetermined staging of audio visual production allows precision presentations which can be timed, sequenced, and tested to take advantage of all time without saturating or destroying the motivation of the user. Other candidate methods for storing data include video memories, sound on slide, or combinations of these. The process of Editing and Storing the essential technical data along with the primary factors considered illustrated at reference numeral 106. In systems actually built video cassettes were used to store the data and a significant compression was actually realized.

The final product of the process is a compressed information library which contains an orderly sequence of modularized data ready for use. In the example, the library consists of series of video-cassettes. Other types of storage systems or a combination of systems may be used.

The usefulness of the library is enhanced by organizing it in modules. In the experimental system, the library was divided into the following modules:

a. an introductory module which quickly summarizes and provides an overview of the system,
b. an instructional module which provides information on the theory of operation, general principles, or design parameters of the subject area,
c. a symptom definition or decision making module which categorizes malfunctions or deviations from standard which can be observed by the user to determine when the equipment is not functioning properly, and a,
d. or maintenance modules which provide detailed instructions to the user in the fault isolation, troubleshooting, and reapir of equipments or possible solutions to problems. The modularized library is illustrated at reference numeral 107.

A system utilizing a library prepared using the above process will provide more effective information and knowledge transfer than conventional methods. This is true because the data to be presented has been carefully selected and organized to accomplish this result. For example, maintenance information may be indexed by symptoms. Beginning with the symptom the technician is directed through a maintenance and repair procedure which has a high probability of restoring normal operation. By using video-cassettes, much information not normally included in maintenance aids, such as accessiblity of parts may be presented. Should the failure be due to a cause not anticipated by the maintenance procedures, the technician is referred back to the theory of operation. This procedure provides a method for the writer of the library to lead the technician directly to the most probable failure based on symptoms. When information is extracted from the compressed information library, it is directly usable. Visual guides may be included to illustrate how the information is to be utilized. For example, the audio channel may be used to tell the technician how to check a component. At the same time, the video channel may be used to show the technician where the component is located.

Figure 2:
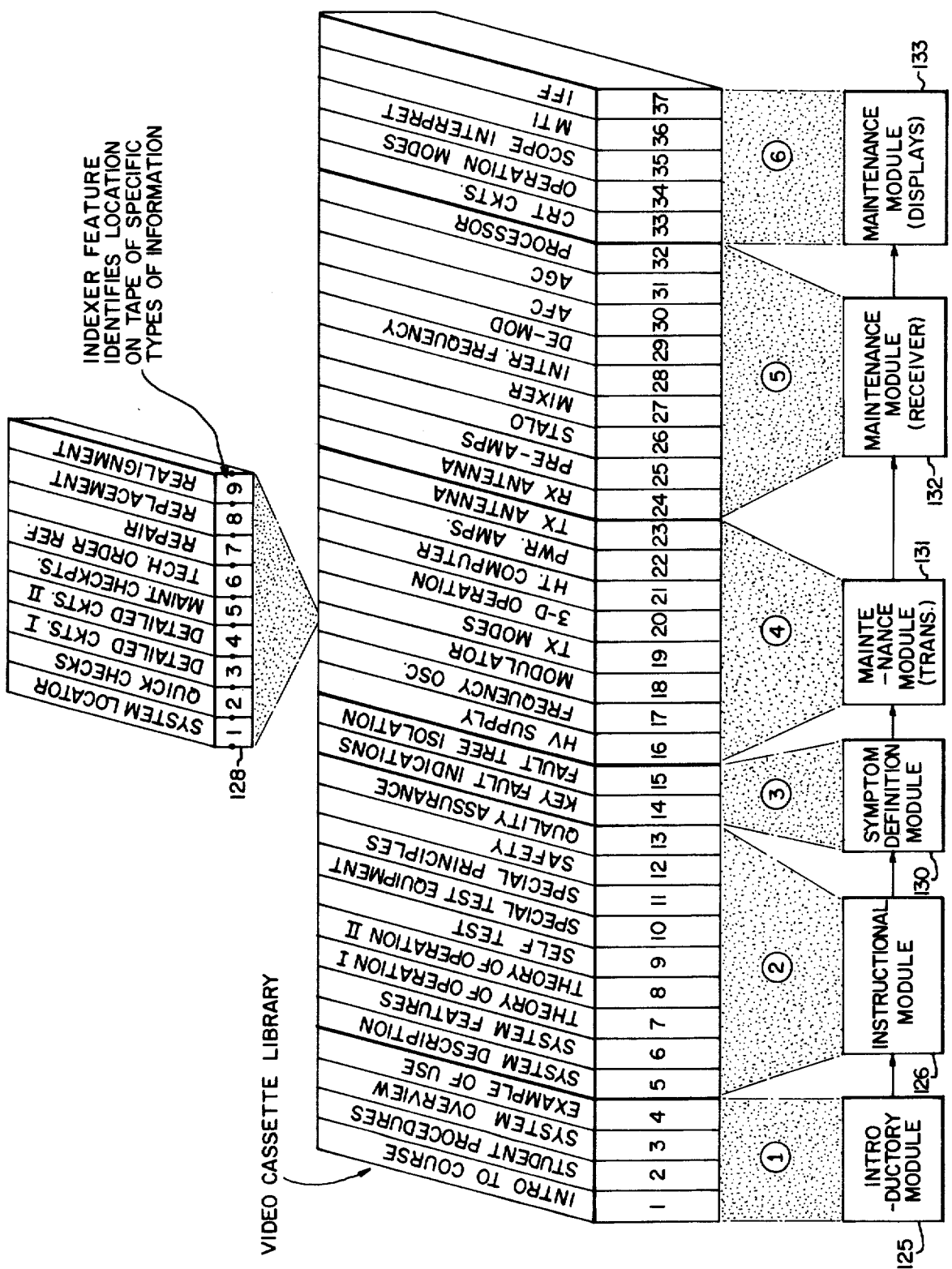
FIG. 2 is a diagram illustrating how a typical video tape library is modularized.

An example of how the system is applied to a typical radar set is shown in FIG. 2 to further illustrate the compressed information system. For this example, video-cassettes have been chosen as the method for information storage and transfer, but any other technique could have been used.

The first two modules 125 and 126, shown on the lower line of blocks represent the instructional phase of the program. In this particular example, the introductory module consists of four separate topics, all of which have been produced on video tape. The total length of a particular segment and the number of cassettes required will be determined by the material to be presented.

The second module 126 provides the user with the majority of instructional data required to fully understand the operation and technical concepts of the system. Individuals previously receiving conventional training related to the subject would use selected material from this module for refresher training. Users having no familiarity with the system would use all cassettes in this module.

Each of the video-cassettes are related to a major section of the radar set. Each cassette is further divided into subtopics. Subtopics and the indexing for the modulator tape are illustrated at reference numeral 128. By the use of an index, the user can proceed directly to the portion of video tape containing the material of interest. The remaining modules are illustrated at reference numerals 130–133.

The third module 130 is utilized to provide an overall system troubleshooting procedure. This module directs the student to the appropriate maintenance modules according to the major fault indications. Each of the maintenance modules contains detailed fault isolation and correction procedures for a selected number of malfunctions. Detailed circuit diagrams are included in the maintenance modules to permit the repair of faults not specifically anticipated by the maintenance proceduces.

The system described above has opened new possibilities for maintenance training aids. The job skills, equipment performance and technical data have been closely interwoven and recorded on tape to create a powerful training and maintenance tool.

Figure 3:
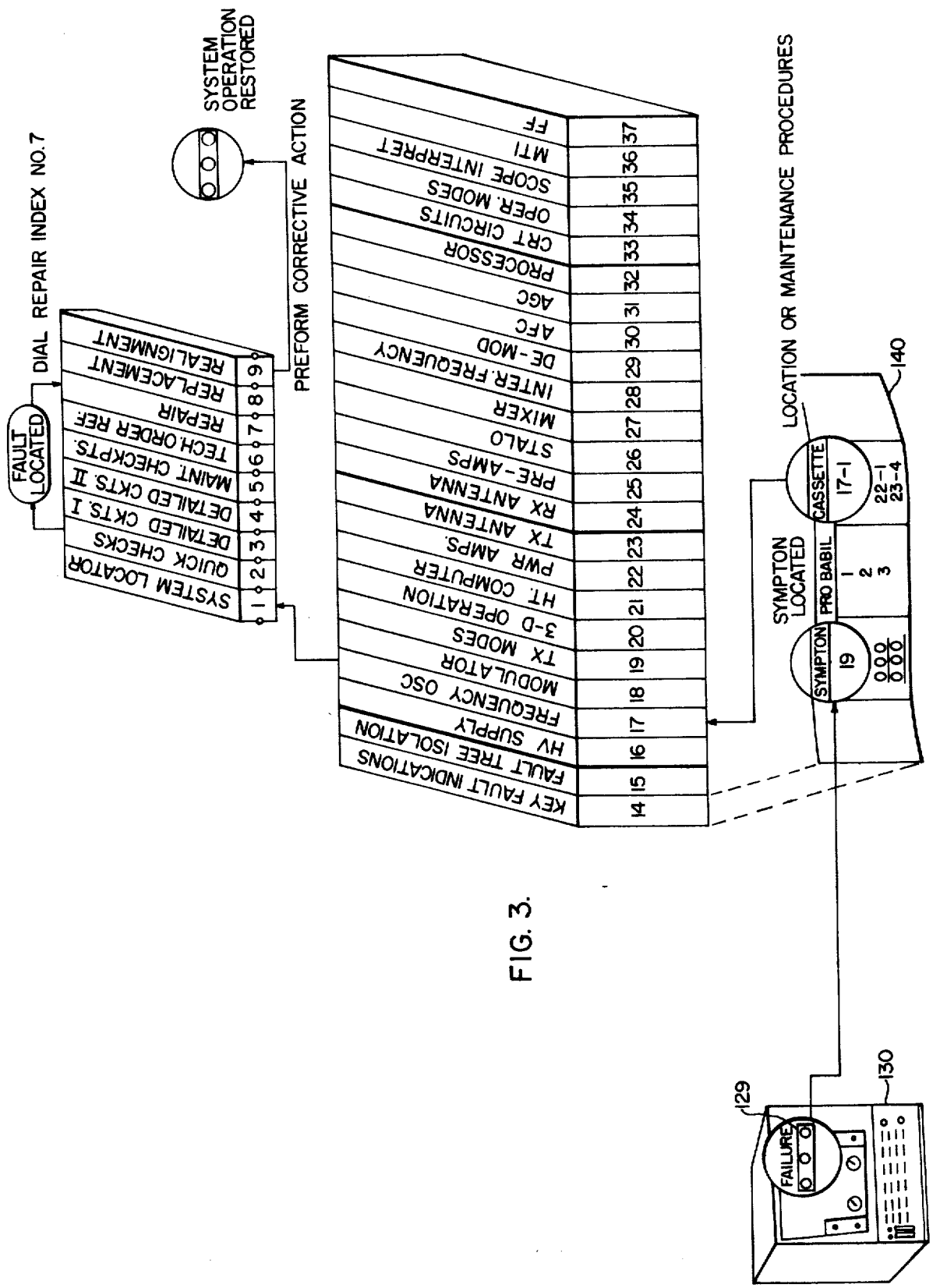
FIG. 3 is a diagram illustrating how the system is used in correcting a malfunction.

FIG. 3 illustrates the use of the system in correcting a typical malfunction of the radar set. The malfunction is detected when a malfunction indicator 129 on the radar 130k is energized. When the energized malfunction is observed by the technician, he consults the users manual to determine where conrrection procedures are located. The manual indicates that index point 19 of Cassette No. 14 is the location of an index of correction procedures most likely to correct the malfunction. For example, cassette 17 index point 1 is the location of a procedure for correcting the most probable fault. Cassette 22 index point 1 and cassette 23 index point 4 is the location of two additional procedures in decreasing order of probability. This procedure can be continued for all likely malfunctions. The analysis of the problem and the permissible size of the library will determine how may procedure should be included.

After determining from the key fault indicator, Cassette No. 14, that the most probable malfunctioning sub-system is the frequency oscillator and that the associated maintanance procedures are located on Cassette No. 17, index point 1, Cassette No. 14 is removed from the playback system and Cassette No. 17 is inserted and indexed to point 1. At this point the technician finds a brief description of the probable cause of the malfunction and is referred to index point 2 for a series of quick checks to isolate the fault.

Assuming that the quick checks isolate the fault, the technician is then referred to index point 7 where detailed repair instructions are located. Following repair, a reference is included to the realignment procedure to be followed to restore the radar to operational status. Other specific malfunctions are similarly described and corrected. Should the malfunction be due to a failure not specifically covered by the maintenance procedures, the technician is referred to detailed descriptions of the circuits. These detailed descriptions enable the technician to repair any fault even though his efficiency may be reduced when these procedures must be used because he must devise his own troubleshooting and repair procedures based on a fundamental understanding of the circuit. Thus, an important element in assuring that the system operate efficiently is the identification of the most probable faults so that these can be specifically treated in the maintenance procedures.

A system for teaching U.S. Navy technician the theory of and providing maintenance procedures for a torpedo exploder test set Model MK-525 MOD-0 Exploder Mechanism was built and tested. The results of the test of this system are tabulated below.

COMPETITIVE EVALUATION RESULTS

|  | Traditional | Video Tape |
|---|---|---|
| Rating Levels | Chiefs, P.O. 1 | P.O. 1,2,3, SN |
| Avg. Civilian School Completed | 12th | 12th |
| Avg. Reading Ability (Dr. Carver Scale) | 10th | 10th |
| Avg. GCT/ARI | 118 | 121 |
| Completed Torpedo Advanced AUW School | Yes | No |
| Prior Troubleshooting Exp. | Yes | No |
| Duration of Training | 60 hrs | 8 hrs(no lab) |
| Avg. Time to Find Faults | 103 min | 56 min |

The development of a typical malfunction correction procedure forming a portion of this system will be described, in detail, as an example of how the system is developed.

Figure 4:
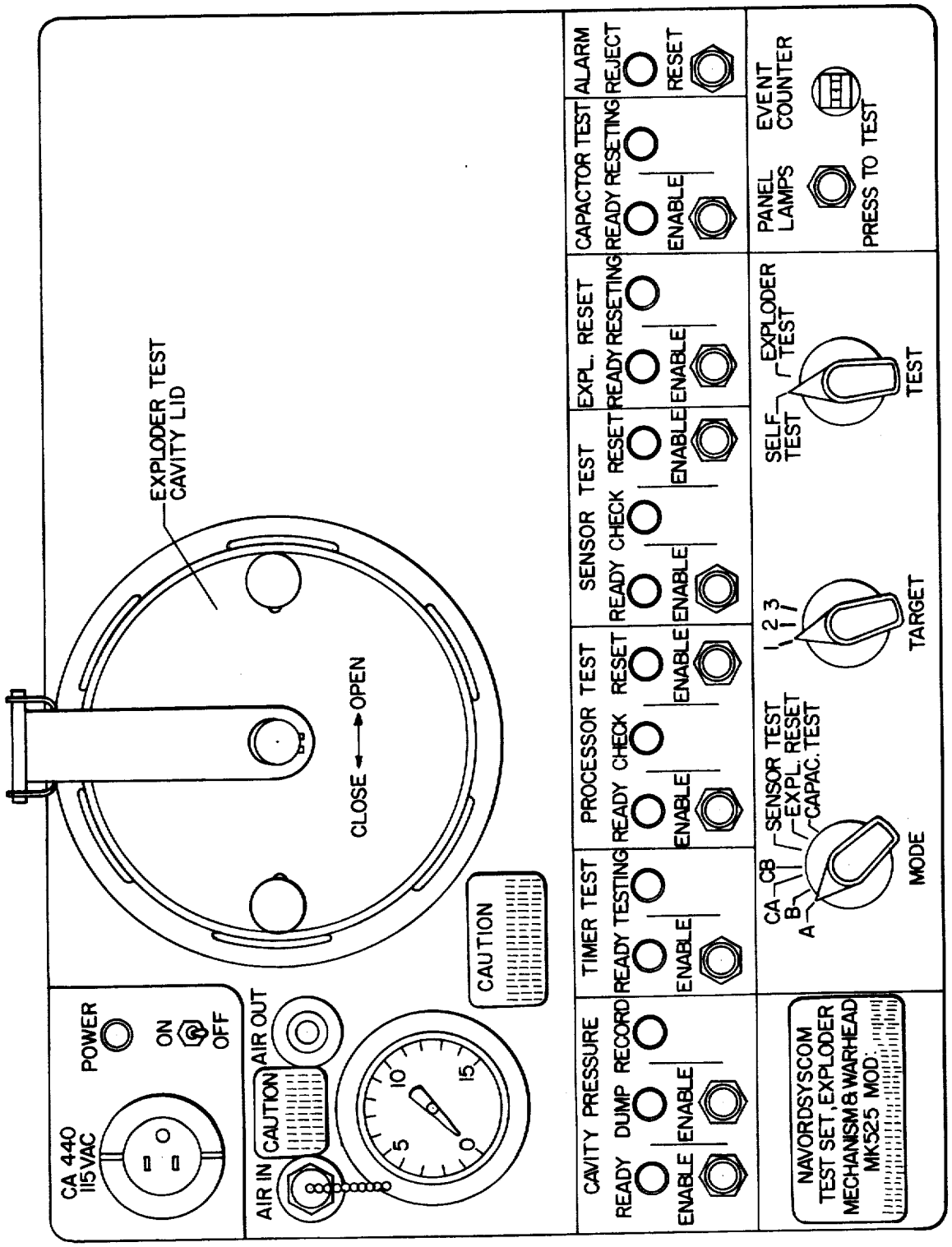
FIG. 4 is a front panel view of a torpedo exploder test set.

The purpose of the MK-525 MOD-0 Exploder Mechanism Test Set — hereafter referred to as the Test Set — is to test the MK-21 MOD-0 Exploder Mechanism. Testing is accomplished via operator actions and responses to indicator lights on the front panel of the Test Set. In addition to performing leak test on the Exploder Mechanism, the Test Set provides both mechanical and electrical stimuli to the Exploder Mechanism and evaluates both mechanical and electrical outputs or the Exploder Mechanism. Six distinct functional tests are performed on the Exploder Mechanism by the Test Set. These six tests are:

Cavity Pressure (Test Exploder Housing For Leaks)
Timer Test
Processor Test
Sensor Test
Exploder Reset
Capacitor Test FIG. 4 is an illustration of the front panel of the MK-525 Test Set and displays the functional tests. Successful completion of the complete set of the six tests is indicated by a pre-established sequence of operator action and front panel indications. Should a malfunction be detected during testing of the Exploder Mechanism an audible and visual alarm is activated. A self test feature is incorporated in the Test Set to assist in determining if the malfunction exists in the Test Set or in the Exploder Mechanism being tested.

The following paragraphs describe, in detail, the development of the library for a system to be used to train and aid technicians in the repair of the Test Set.

The first major step in applying the concept to the Test Set, as illustrated at reference numeral 100 in FIG. 1, is a reveiw and analysis phase. This step consists of three subdivisions; the first of which is the definition of the functions to be performed by the user and the knowledge to be acquired by using the system. This definition included two elements; a Job Task Analysis and the completion of a Reliability Prediction Analysis of the electronic/electromechanical components of the Test Set.

A Job Task Analysis can vary from a very exhaustive and comprehensive effort culminating in a formal report to an informal round-table discussion with the conclusions listed on a blackboard. A number of techniques exist for performing a Job Task Analysis. One technique involves observation and discussion with personnel performing similar jobs and listing all the tasks that they perform, followed by a compilation of these tasks by functional grouping of similar type tasks. Eventually, these tasks must be related to the particular applications.

The Job Task Analysis for the Test Set was initiated by studying and analyzing the technical documentation provided for the Test Set and Exploder Mechanism and by operating the Test Set to develop a complete technical understanding of the Test Set. The type of data contained in the technical documentatation included:

a. Description (physical, controls and indicators),
b. Principles of operation,
c. Preparation for use, shipment and storage,
d. Maintenance and troubleshooting,
e. Calibration, procedures, and,
f. Repair parts List.

At the completion of this technical analysis, a general list of tasks that an operator/maintenance technician would perform as related to the Test Set was created by relating first hand experience in operating and maintaining similar electromechanical equipments and the contract requirement of maintenance to the component/printed circuit board level. The task list for the technician skills are as follows:

a. unpack and/or pack the Test Set,
b. locate and identify all front panel controls and indicators,
c. use the Test Set to check an Exploder Mechanism,
d. recognize a deviation from proper test procedures and results,
e. remove the Test Set from its shipping container and replace same,
f. identify and locate discrete components such as relays, diodes, lamps, switches, etc. or printed circuit boards,
g. fault isolate to the above components or printed circuit boards,
h. utilize hand tools and electronic test equipment as identified in the technical documentation provided with the Test Set, and
i. remove and replace faulty components/ printed circuit boards.

The end user was identified contractually as a U.S. Navy Torpedoman 3rd class, and as such possessed a basic knowledge of electronics, the ability to use common hand tools and electronic test equipment (including those items necessary in the maintenance of the Test Set). The Torpedoman 3rd class has a limited amount of experience in the application of his training and knowledge.

analysis. (A contract deliverable item - Reliability Analysis Report - contained all of the work sheets). A copy of one of the completed works sheets is shown below.

RELIABILITY PREDICTION WORK SHEET

ASSEMBLY MODULE: MK 525 MOD 0 EXPLODER MECHANISM TEST SET Chassis
DRAWING NUMBER 2501133 REVISION LETTER R
AMBIENT TEMPERATURE 50° C
DATE October 22, 1973
PREPARED BY: J. A. Stoops

| REFERENCE DESIG. NUMBER | NAME TYPE AND CLASS | DRAWING NUMBER | MIL SPEC OR MANU-FACTURE NUMBER | RATED STRESS | ACTUAL STRESS | STRESS RATIO | FAILURE RATE/$10^6$ HOUR | | NOTES |
|---|---|---|---|---|---|---|---|---|---|
| R 7 | Resistor,Var. | RV4LAY251A | R94-E | 2W | .025W | <.1 | | 2.6700 | |
| 8–10 | Resistor,Var. | RV4LAY752A | R94-E | 2W | .750W | .38 | 3.60 ×2 | 7.2000 | |
| C 1 | Capacitor | CM06FD222JP3 | C-5 | 500V | MAX. 28V | <.1 | | .1200 | |
| K 1 | Relay DPDT | 2498898-001 | | | | 2/HR | | .1037 | |
| 2 | Relay DPDT,DPST | RY41B3L01 | | | | 24/HR | | .5806 | |
| 3,7,9,12 | Relay SPST,SPDT | 2498898-001 | 5757/23 | | | 2/HR | .1901 ×4 | .7604 | |
| 4 | Relay SPST | | | | | 18/HR | | .1244 | |
| 5 | Relay | | | | | 10/HR | | .1901 | |
| 6 | Relay | | | | | 34/HR | | .3625 | |
| 8,11,13 | Relay DPST | | | | | 2/HR | .1037 ×3 | .3111 | |
| 10,22 | Relay DPST | | | | | 4/HR | .2074 ×2 | .4158 | |
| 14 | Relay DPST | | | | | 2/HR | | .1037 | |
| 15,18 | Relay SPST,SPDT | | | | | 2/HR | .1901 ×2 | .3802 | |
| 16 | Relay SPST | | | | | 2/HR | | .0691 | |
| 17 | Relay DPST | | | | | 2/HR | | .1037 | |
| 19 | Relay SPST Time Delay | 2498823-001 | | | | 6/HR | | 2.4131 | 4 |
| 20 | Relay DPST Time Delay | 248823-001 | | | | 22/HR | | 2.6551 | |
| 21 | Relay Reset Timer | 2498913-001 | | | | 2/HR | | .4751 | |
| 23 | Relay DPST Time Delay | 2498823-001 | | | | 24/HR | | 2.6894 | |
| 24 | Relay SPST,SPDT Time Delay | 2498823-001 | | | | 2/HR | | 2.5341 | |
| 25 | Relay DPST Time Delay | | | | | 2/HR | | 2.4837 • | |

After comparing the necessary operator and maintenance performance objectives with the existing capabilities of the Torpedoman 3rd class, it was determined that the following information unique to the Test Set must be provided to the user:

a. unpacking/packing procedures,
b. operating procedures,
c. component identification and location, and
d. fault isolation data — both theory of operation and maintenance procedures.

A Reliablity Prediction Analysis was conducted to support the level of maintenance identified in the contract as required for the Test Set. Since fault isolation was to the replaceable electronic component, a reliability analysis was made for each electronic or electromechanical component and printed circuit board as identified in the Repair Parts List contained in the technical documentation associated with the Test Set. This particular reliability analysis was developed using the procedures outlined in MIL-STD-756A, Reliability Prediction, using data from MIL-HDBK-217B, Reliability Prediction, as the prime reference. This also defined the maintenance techniques to be used as fault isolation to a component, beginning with a symptom and the replacement by the faulty component.

The completion of Reliablity Analysis Work Sheets provided formal documentation of the conduct of the The information to complete the first five columns was obtained from the Repair Parts List provided in the Test Set technical documentation. This data is a listing of all Test Set electrical components by schematic reference designation, the type of the component, drawing number (part number), the Military Specification or Manufacture Number (if applicable) and, where applicable, the component rated stress. The data for actual stress was determined, as necessary, by actual in-circuit voltage and/or current measurements using electronic test equipment. The stress ratio for passive components was directly calculated by dividing actual stress by rated stress. The stress ratio for other components, for example electromechanical components such as relays or switches, was determined by the number of times the particular component is exercised during one complete Test Set use cycle (thirty minutes estimated). Applying this data to the previously identified Reliability Prediction reference, the failure rate per $10^6$ hours was calculated and entered in the work sheet. When all work sheets were completed, all components were tabulated in descending order of predicted failure per $10^6$ hours. A partial sample of this tabulation is shown below. This tabular listing of components and predicted failure rate was another input to phase two, the technical organization phase.

Components List

Ordered by Descending Value of Failure Rate

| Part Number | Schematic Designation | Failure Rate Per 10 Hr. |
|---|---|---|
| 1498832-001 | S2 | 694.74 |
| 1498831-001 | S1 | 239.39 |
| MS24547-1 | S17 | 168.00 |
| MS25089-3F | S7 | 108.00 |
| MS25089-2F | S12 | 51.00 |
| 1498954-001 | PS-1 | 50.00 |
| 1498954-002 | PS 2,3 | 50.00 |
| 1498953-001 | PS 4 | 50.00 |
| MS25089-2F | S8 | 36.00 |
| 1498833-001 | S3 | 15.04 |
| 1500446 | A5 | 12.7259 |
| 1500452 | A2 | 12.4678 |
| 1494838 | A6 | 12.2735 |
| MS25089-2F | S10 | 12.0 |
| 1506162-002 | L12 | 11.0 |
| 1500673 | A8 | 10.9618 |
| 1500445 | A7 | 10.8941 |
| 1494846 | A3 | 10.8773 |

The Data Determination (functionally illustrated at reference numeral 102 of FIG. 1) subdivision involved a review of different forms of maintenance aids to see which, if any of the features of these aids could be utilized on this program. It must be pointed out that the effort expended toward this type of review for other applications may very well require an extensive amount of research. The maintenance aids selected for review were (1) Symbolic Integrated Maintenance Manuals (SIMMS), (2) Maintenance Dependency Charts (MDC's), (3) Job performance Aids (JPA's) and (4) Functional Diagrams. These aids already existed for the test.

The first Maintenance Aid that was examined was the Symbolic Integrated Maintenance Manual. A feature that was incorporated into the final program was the concept of various shades of color to signify function and maintenance level. This technique applied to visuals produced for both the training and maintenance portions of the library.

The second Maintenance Aid that was examined was a Maintenance Dependency Chart. The features considered included:

a. a listing of symptoms,
b. switch settings, and
c. identification of measurement location and corresponding normal measurement. It was felt that the combination of maintenance level (to the component) and reliability analysis would lend itself to some form of chart or matrix as a maintenance aid.

Another Maintenance Aid that was reviewed was the Job Performance Aid. The feature which was extracted was that of pictorially relating the written word in the form of theory, procedures, etc. with the physical hardware.

The conventional technique employed by technical training personnel in conducting formal electronic's training is to create simplified functional diagrams which use left-to-right major data flow, simplified circuit diagrams, identification of test points, and plug and pin identification. As such, this aspect of the Data Determination subdivision, was not actively reviewed, as might be the situation for personnel not intimately familiar with this phase of conventional technical training. It was determined that some form of visual diagram to support training and/or maintenance would be required but no research would be necessary at this point in the program.

The third major subdivision of step one is researching various instructional techniques for the purpose of selecting the most applicable method to be applied to the training program at hand. This step is functionally illustrated at reference numeral 103 of FIG. 1.

Most experienced instructor have, through his formal training and years of developing training programs, arrived at the systematic approach to training which very often becomes second nature. Consequently, decisions are made without realizing that they have actually been made. Only a few of these considerations are presented here, but many others were inherent in the approach taken to implement the various major steps of this program.

Techniques selected included the introduction of material in small amounts, usually less than one hour, so that the new information presented can be understood and retained. Another technique used was to relate the content of the training program to the knowledge and skills required for the performance of the end task. If a knowledge or a skill was not necessary, it was not included in the course content.

The second major step in the application of the Compressed Information System concept to the Test Set is that of technical organization of the data. This step is functionally illustrated at reference numeral 104 of FIG. 1. It is at this point that the results and conclusions drawn from the elements of step one were integrated. The two primary decisions which resulted from this step were:

a. the subject matter to be presented on each of the twenty-four video-cassettes, and
b. the depth of coverage for each of the subjects. As a result of the Job Task Analysis, the material to be presented on the twenty-four 30-minute cassettes were separated into: (1) Operation of the Test Set (2) Theory of Operation and (3) Maintenance. From the training aspect of this program, it is good practice to inform the trainee of what he is expected to know and be able to do at the completion of the course. Since this was an experimental program and the first real use of the video medium for training and maintenance, it was decided that the first tape would be used to describe the objectives of the program and to introduce the user to the hardware/software which he would use.

The first of the above three categories — Operation — was further subdivided, based on the Job Task Analysis, to include (1) Unpacking of the Test Set, (2) the exercise of the SELF TEST feature of the Test Set and (3) the use of the Test Set to test a Exploder Mechanism. The latter is termed "EXPLODER TEST".

The technical analysis of the Test Set indicated that the theory of operation should be presented in accordance with the six functional tests that are provided by the Test Set. The technical complexity further indicated the one test "Processor Test" would require more explanation than the other functional tests. Experience in teaching complex electronic systems suggested that a better understanding of the operation of this test set and the interface with the unit-under-test could be accomplished by presenting a brief description of the Exploder Mechanism.

Guidelines for the level of presentation for the preceding subjects which comprise the training portion of the program were based on a number of interrelated considerations.

First was the goal of presenting only that information which the trainee needs to perform on his job. This is a form of technical compression. One example of this compression is to eliminate the component by component detailed operation of the circuitry contained on the printed circuit board since, in this situation, the trainee need only determine if the printed circuit board is faulty, not which component on the board is causing the fault.

A second consideration is related to proper instructional technique. It was decided that the theory of operation for each of the six functional tests would be presented using the following outline.

1. Review sequence of operator actions for that particular test.
2. Group the circuitry unique to this test into functional blocks and describe the purpose of each block.
3. using a simplified schematic diagram showing only the components which apply to the particular test, present the signal flow from source to destination inthe same sequence as the operator performs the test. Throughout the presentation for each functional test, references to the actual hardware was used to reinforce the relationship between operator front panel controls and indications and the simplified schematic.

This method of organizing the training aspect of the program serves two purposes: (1) new material is presented in small logical increments related to the Job Task Analysis and (2) proper operation of The hardware is continually reviewed so that if a malfunction of the hardware occurs the trainee will realize that something is wrong.

Based on these considerations the number of cassettes to be utilized and subject matter of each video-cassette was determined. AM index of the video-cassettes was made. The index is shown below.

| VIDEO CASSETTE INDEX | |
|---|---|
| Cassette No. | Subject Matter of Cassette |
| 1 | Introduction to Test Set |
| 2 | Preparation for Use/Self Test |
| 3 | Functional Analysis of Exploder Mechanism |
| 4 | Circuit Description - Cavity Pressure Test |
| 5 | Circuit Description - Timer Test |
| 6 | Circuit Description - Processor Test |
| 7 | Circuit Description - Processor Test |
| 8 | Circuit Description - Sensor Test |
| 9 | Circuit Description - Exploder Reset Test |
| 10 | Circuit Description - Capacitor Test |
| 11 | Troubleshooting Procedures and Parts Location |
| 12 | Pneumatic Subsystem and Troubleshooting Techniques |
| 13 | Part I - Cavity Pressure Test Maintenance and Troubleshooting |
| 14 | Part II - Cavity Pressure Test Maintenance and Troubleshooting |
| 15 | Part I - Timer Test Maintenance and Troubleshooting |
| 16 | Part II - Timer Test Maintenance and Troubleshooting |
| 17 | Part I - Processor Test Maintenance and Troubleshooting |
| 18 | Part II - Processor Maintenance and Troubleshooting |
| 19 | Part III - Processor Test Maintenance and Troubleshooting |
| 20 | Part IV - Processor Maintenance and Troubleshooting |
| 21 | Part I - Sensor Test Maintenance and Troubleshooting |

| VIDEO CASSETTE INDEX -continued | |
|---|---|
| Cassette No. | Subject Matter of Cassette |
| 22 | Part II - Sensor Test Maintenance and Troubleshooting |
| 23 | Exploder Reset Test Maintenance and Troubleshooting |
| 24 | Capacitor Test Maintenance and Troubleshooting |

The results of the maintenance oriented portion of the Job Task Analysis and the level of maintenance to be performed, dictated that when a malfunction occurs, the technician would be able to fault isolate to a discrete component.

The fault isolation method to be developed would begin with some form of maintenance aid which would rapidly relate operator recognized symptoms (in general, the fact that an event or indication did not occur, or occurred out of sequence) to specific components. Of course, the use of such an aid would have to be explained to the technician. This maintenance aid, when developed, would represent a form of technical compression in that the extensive technical analysis required to relate symptoms and components would not need to be performed by the technician.

Electronic troubleshooting by the technician requires a knowledge of component location, the sequence of components to be checked, expected normal measurements (voltage, resistance, etc.), location of actual measurement points, etc. The use of video-cassettes allows the technician to be shown exactly how to troubleshoot a particular symptom by visually relating the above. Again, a compression will be achieved by eliminating the need for the technician to analyze the Test Set and determine the required information.

Experience in troubleshooting electronic hardware, confirmed by the technical analysis of the Test Set, suggested that very often, a single symptom could be caused by more than one component. When this is the case, the order in which the components would be checked will be based on the results of the Reliability Prediction Analysis. Since the Reliability Prediction Analysis included only electronic or electromechanical components, information to support the troubleshooting of the pneumatic components would need to be provided.

The Job Task Analysis, coupled with limited knowledge and practical experience of the Torpedoman 3rd Class, led to the decision that the maintenance portion of the program should include a review of the standard 6 step troubleshooting procedure as related to the Test Set and component troubleshooting data unique to this test set (e.g., diode resistances, relay contact location, etc.).

It was decided that the format for presenting the troubleshooting information would be the same for all fault isolation segments, and further, that the logical grouping of (1) symptoms in users maintenance aid and (2) fault isolation segments on the video-cassettes, be based on the six functional tests provided by the Test Set.

The third major step in developing a Compressed Information System is that of Information Transfer Methodology. This step is functionally illustrated at reference numeral 105 of FIG. 1. The techniques and formats to be utilized during this effort are dependent on the form of the final library. This form may be the printed page, sound tape and slides, video-cassettes, transparencies, etc. Whatever the form, both written word and visuals will probably be required in a format convenient for the final medium.

In this particular application, the library was to be a set of video-cassettes. As such, both a written script containing the audio information to be recorded and production directions for what is to be seen by the user and visuals (graphics) must be conceived and produced.

Although there were a number of different types of scripts and associated visuals to be prepared (Introduction, Operation, Theory of Operation, Maintenance Information and Fault Isolation), the discussion which follows will deal with only one of the six functional tests, the Cavity Pressure Test. The techniques and considerations which apply to this one test can then be extended to the other functional tests. Likewise, only two types of scripts and visuals which apply to this test will be described, the circuit description (Theory of Operation) and Fault Isolation (Troubleshooting). With respect to fault isolation, the development of the maintenance aid, later called the Fault Isolation Matrix Chart is also described.

The first item developed in support of the cavity pressure circuit description script was a preliminary simplified schematic diagram. This was developed from a single page schematic, contained in the technical documentation provided with the Test Set, and contained the circuitry for the entire Test Set. The concern was to eliminate all components which were not used in the cavity pressure test. This elimination of components was accomplished by the review and analysis of the technical documentation and the technical knowledge and experience of th program personnel. Once this initial drawing was made, a technical script was written which, in essence, described the theory of operation of the cavity pressure circuitry based on the sequence of operation of this test.

The next step was to write primarily the audio portion of the production script but to note associated video. The writing of the production script was based on the technical script but was expanded to contain the information decided upon during the technical organization phase (i.e., review operational sequence of test, describe the purpose of groups of components and detailed signal flow).

The operational sequence was written using the procedures provided in the Test Set technical documentation. The associated video always related to front panel controls or indications. The functional grouping of components was accomplished by relating components to the primary functions accomplished within a test and then designating sequential numbers to the groups. The circuit description was based on the technical script. Whenever a front panel control or indicator is of major importance, it is re-inforced by noting this in the video portion of the script. The production script and preliminary simplified schematic was then reviewed for technical accuracy and typed.

When this step is completed, the graphics are then produced using guidelines for television graphics. Two of the guidelines were, 1. overall dimensions are 3 units high by 4 units wide (3 × 4 aspect ratio), and 2. to be seen clearly at a distance of 4 feet from the TV Monitor, the lettering must be about nine scanning lines when then is related to actual height of the graphics lettering. Also, when the simplfied schematic (FIG. 5) was produced in its final form, the functional grouping was incorporated along with standard electronic symbols. One other factor was incorporated into the production of the simplifed schematic. To reinforce the functional grouping, visual gray shading was utilized in FIG. 5. Since the circuit description video-cassettes were to be produced in black- and-white, shades of gray were employed to indicate the functional grouping.

It was decided that through the use of the fault isolation matrix the user must be able to rapidly relate user recognized symptoms to those components which, if faulty, could cause that symptom. In the case of the Cavity Pressure test, the symptoms were related to the sequence of events as they occur and took the form of either visual indications or audible indications. Once the test sequence indications are defined, the next step was to identify those malfunctions which could occur, in the sequence of performing the test, and which could be identified by the test sequence indications. A matrix was then formed by listing test sequence indications horizontally and arranging the symptoms, in order of occurrence, vertically. The two items are visually related using an X to signify that an indication occurred, a O to signify that the indication did not occur, and a dash to signify that the indication was not important to the symptom. Further, there are three front panel switches which are used to pre-condition the Test Set for each functional test. It was decided to include the position of each of these three switches as a reminder to the technician. The first line or "symptom" was included in reinforce proper operation of the test and this is signified by "NONE" in the column labeled Possible Faulty Components.

The next step in developing the fault isolation matrix was to identify the components which could possibly cause each symptom. This in general a three-step process for each symptom. First, list the components as they occur in the circuit from source to destination. Second, eliminate those components which have been confirmed as operational based on successfully completing previous steps of the test. Third, using the listing of components in decreasing order of predicted failure rate from the Reliability Prediction Analysis, rearrange the list of components remaining from steps one and two so that the component with the highest rate of failure is listed firts, and the others are listed in decreasing failure rate.

The fault isolation matrix, in its final form, contained the following three additional columns of reference data:

1. Paragraph in Technical Documentation containing information on the functional test.
2. Circuit Description video-cassette Number.
3. Fault Isolation Index Point. The first was obtained by locating the information in the Operating Procedures for the Test Set (designated OP-4029). The second was determined from the program orgnaization as determined in phase two. In this case, video-cassette number 4. The last reference consists of two parts; the number of the fault isolation segment on that video- cassette. Although the number of fault of isolation cassette is known from phase two, the location of the segment on the cassette is not known until the video-cassette is produced.

A copy of a portion of a fault isolation guide is illustrated below:

nent is not readily accessible, pick a measurement point which is electrically the same. Quite obviously, it was impractical to acutally fault each ocmpent for each symptom. Consequently it was de-

| TEST | Switch Position | | | | | TEST SEQUENCE INDICATIONS | | | | | | | REFERENCES | | | |
|---|---|---|---|---|---|---|---|---|---|---|---|---|---|---|---|---|
| CAVITY Mode | Target | Test | Ready Lamp | Pump (A) | Dump Lamp | Gage | BELL/ Record Lamp-1 min. | BELL/ Record Lamp-6 min. | Dump Cavity | Alarm Reject | Timer Test Ready | Possible Faulty Components | Fault Isolation Tape | Circuit Description Tape | Technical Description | Remarks |
| A | N/A | EXP | X | X | X | X | X | X | X | O | X | NONE | | 4 | 3-2 | Timer Test Ready denotes end of test |
| " | " | " | O | — | — | — | — | — | — | — | — | S19, S21, DS2, K10 K1, K17, AP3CR42 | 13-144 | " | " | |
| " | " | " | X | O | — | — | — | — | — | — | — | S1, S20, S24,S4 B2, K9, A16R2 | 14-026 | " | " | |
| " | " | " | X | O | X | — | — | — | — | — | — | S24, B2, A16R2 | 13-390 | " | " | |
| " | " | " | X | X | O | X | X | X | X | O | X | DS3, A13CR45 | | " | " | |
| " | " | " | X | R X | X | O | — | — | — | — | — | K1 | | | | Pump stops when S4 is released |
| " | " | " | X | R X | X | X | — | — | — | — | — | S24, A16C2 | 14-256 | " | " | Pump continues to run after 12 psig obtained |
| " | " | " | X | X | X | O | — | — | — | — | — | L2 | | " | " | |
| " | " | " | X | X | X | X | O | O | X | O | O | K21, K9 | 14-305 | " | " | |
| " | " | " | X | X | X | X | O | X | X | O | X | K21, | | " | " | |
| " | " | " | X | X | X | X | X | O | X | O | X | A13CR49 | | " | " | |

NOTE:
X = Occurs  O = Does not occur  — = not required  R = Refer to Remarks

The writing of the script for the troubleshooting video-cassettes is accomplished by combining information from the circuit description scripts and the fault isolation matrix. Since fault isolation for every symptom could not be presented on the video-cassettes due to the limited amount of time available for presentation, it was decided that those symptoms with only one possible fautly component or those symptoms with two possible faulty components, of which one was a front panel lamp, would not be presented. Of those symptoms remaining, as many fault isolation segments which could be presented on the allocated cassettes would be included.

Each fault isolation segment was presented in the following pattern:
 a. state the symptom,
 b. use circuit description graphic to briefly review only the circuitry involved in the symptom,
 c. identify the components, in the order of predicted failure rate, which could cause the symptom. Use the fault isolation matrix as a graphic, and
 d. in the order identified above, for each component, show the actual point of measurement, state the value of the measurement (the value expected if the component is good) and reinforce by showing the measurement on the test equipment. There are many practical considerations which must be taken into account in writing the script. First, if a compocided to display the measurement as if the component were good. Also, the measurements for each component must be shown, since it is not known which component is at fault.

In addition, the first measurement for each component was at its output, and the second at its input. The implication, and this was explained as part of th eprgram, is that simple conclusions should be drawn from each measuremetn. If the first measurement (the component output) is correct, all components from that point back to the source are good, There is no need to check them further and they should be eliminated from the list of suspect components for this symptom, reducing the numbe of suspect components to these between this measurement and the end result.

If the first measurement (output of component) is incorrect, and the input is correct, this component is faulty. On the other hand, if the input to the component is also incorrect, then the faulty component lies between this point and the source. To make these conclusions, the technician is to refer to the copy of the simplified schematic (FIG. 5).

The results of this major step —Information Transfer Methodlogy —is a set of twenty-four preliminary production scripts and associated graphics to be used to produce twenty-four 30-minute video-cassettes and the software (fault isolation matrix, simplified schematic and gry scale block diagrams) to be used by the technician.

The following is a copy of a maintenance script resulting from this procedure.

| Video | Audio |
|---|---|
| Point to each component as they are discussed. | The components which could cause the fault, pump does not run, are listed on the matrix in the order most likely to fail. These are, S1 mode switch, S20 cavity lid interlock, S24 pressure switch, S4 cavity pressure enable switch, B2, K9, and A16R2. |
| Loading at mode switch. | The 8 and 1 contacts of S1A, the Mode Switch, are on the inter wafer of S1, a point that is not easily accessible for measuring without disassembly of the test set. This is also true for the next component listed on the matrix, S20, the cavity lid interlock. |
| Simplified Schematic Diagram | Looking at the schematic, the first point that is readily accessible in the line is the B2 contact of K9. |
| Display cavity unit, then K9 followed by contact B2 | Therefore we will measure the voltage at the B2 contact of K9 which should read 115 VAC, between K9-B2 and TB2-1. |
| Display cavity unit followed by meter reading 115 VAC | One probe on K9/B2, other probe on TB2-1. Remember 115 VAC. |
| Display Simplified Schematic Diagram | If 115 VAC is present at the B2 contact of K9, it is verified that both S1A and S20 are not faulty. However, if 115 VAC is not present at this point, it narrows the possible faulty components to Mode Switch S1A or Cavity Lid Interlock S20. To measure the contact Voltage of the switches, the control panel must be separated from the test set chassis in accordance with Job Sheet 5–4 in OP 4029. |

The fourth major step —Edit and Store —is the process of producing the final product. In this application, since the library is to take the form of video-cassettes, two primary elements are involved. These are:
1. Pre-preduction planning, and
2. Production (master tape and multiple copies of cassettes).

Pro-production plainning involved a review of the preliminary production script by the director responsible for the television production. The director timed the scripts to ensure that they would not exceed the thirty minutes of tape for each video-cassette and also finalized the sequence of video scenes. In addition, since this was to be a muliple TV camera production, the director informed all production crew members of their individual responsibilities during production.

The production of the master tape for each cassette followed standard televeision techniques and procedures. The use of video and its associated production techniques provides another compression of information. For example, in conventional training presentations a great deal of time is lost in relating a sechematic to actual hardware by having to stop, point to the location of the item being discussed and then turning the equipment to get to the next item. In a laboratory situation, when a large number of students ar involved, a particular demonstration may have to be repeated more than once. These are just a few of the many examples of time consumption. Using video production techniques, all of this time is eliminated and theresulting presentation is echanced.

When the set of master tapes was completed, the information was transferred to the final form of 3/4‘ video- cassettes. At the same time the fault isolation matrix and reduced size block diagrams and simplified schematics were printed and place in a binder labelled Test Set — Fault Isolation Guide.

The complete library for the test set is shown in FIG. 6. The completed system consisted of this library and the associated video playback system. All the components of the system are available as commercial items.

The completed system is used to teach the theory of the Test Set and to locate and repair malfunction therein in a manner previously explained with reference to the system illustrated in FIG. 3.

We claim:

1. The method of repairing apparatus by utilizing a maintenace system which includes, (a) data storage means wherein coordinated audion and visual data comprising visual and audio presentation of maintenance procedures relate to said apparatus are stored, (b) audio reproduction and visual display means, and (c) data retrieval mean spermitting the selective recovery of said stored data to activate said audio reproduction means and said visual display means, the method comprising the steps pf:
 1. utilizing a symptom of a malfunction of said apparatus for the selective recovery of said stored data by index in said data retrieval means to the beginning of one of said maintenance procedures;
 2. activating said audio reproduction meas and said visual diaplay means in response to said indexing so as to generate a visual display and audio description of the selected maintenance procedure for use in correcting said malfunction.

* * * * *